(12) United States Patent
Funk

(10) Patent No.: US 6,186,557 B1
(45) Date of Patent: Feb. 13, 2001

(54) PIPE CONNECTION AND COMBINATION OF A CONNECTION AND A DETACHING TOOL

(75) Inventor: Hans Georg Funk, Hungen (DE)

(73) Assignee: Johannes Schafer Vorm. Stettiner Schrauben Werke GmbH & Co. KG, Hungen (DE)

( * ) Notice: Under 35 U.S.C. 154(b), the term of this patent shall be extended for 0 days.

(21) Appl. No.: 09/147,599

(22) PCT Filed: Jun. 18, 1998

(86) PCT No.: PCT/DE98/01687

§ 371 Date: Jan. 29, 1999

§ 102(e) Date: Jan. 29, 1999

(87) PCT Pub. No.: WO99/01691

PCT Pub. Date: Jan. 14, 1999

(30) Foreign Application Priority Data

Feb. 24, 1998 (DE) .......................................... 298 03 195 U

(51) Int. Cl.⁷ ....................................................... F16L 35/00
(52) U.S. Cl. ............................... 285/39; 285/81; 285/308; 285/321; 285/330; 285/906
(58) Field of Search ............................... 285/39, 308, 321, 285/330, 81, 906

(56) References Cited

U.S. PATENT DOCUMENTS

| | | | |
|---|---|---|---|
| 1,946,063 | * 2/1934 | Dodge | 285/39 |
| 2,175,575 | * 10/1939 | Shoemaker | 285/39 |
| 2,737,950 | * 3/1956 | Berthiot | 285/308 |
| 3,201,149 | * 8/1965 | Bragg | 285/39 |
| 3,434,743 | * 3/1969 | Boeker | 295/39 |
| 4,471,978 | 9/1984 | Kramer . | |
| 4,728,076 | * 3/1988 | Ganshorn et al. | 285/39 |
| 5,226,682 | 7/1993 | Marrison et al. . | |
| 5,419,594 | 5/1995 | Nelms . | |
| 5,482,083 | 1/1996 | Jenski . | |
| 5,553,895 | 9/1996 | Karl et al. . | |
| 5,570,910 | 11/1996 | Highlen . | |
| 5,934,709 | * 8/1999 | Morrison | 285/39 |

FOREIGN PATENT DOCUMENTS 0 615 089  9/1994 (EP) .

* cited by examiner

*Primary Examiner*—Dave W. Arola
(74) *Attorney, Agent, or Firm*—Arent Fox Kintner Plotkin & Kahn, PLLC

(57) ABSTRACT

The invention is directed to a coupling assembly having a male member (1) with a spigot (5) to be received in an opening (21) in a female member (2), and a radially deformable retaining element (3) which is arranged in a recess (22) in the female member (2) and is radially elastically deformable and adapted to be urged into the recess (22) during the coupling operation by a support element (12) disposed on the spigot (5). In the locked position, the spigot (5) is locked against being pulled out of the opening due to the cooperation between the support element (12) and the retaining element (3). To uncouple the coupling assembly, an unlocking element (15) is provided. The support element (15) is releasably connected with the spigot (5) in order to enable assembly of the unlocking element (15).

21 Claims, 6 Drawing Sheets

PIPE CONNECTION AND COMBINATION OF A CONNECTION AND A DETACHING TOOL

This invention relates to a coupling assembly for pipelines having two connecting members, namely a male member and a female member which are connectable to and separable from each other, the male member having a spigot to be received in an opening in the female member for locking engagement therein by means of a radially deformable retaining element which is arranged in a recess in the female member's opening and is adapted to be urged into this recess by radial elastic deformation during the coupling operation, the spigot being provided with a recess into which the retaining element, due to elastic recovery, engages in the locked position of the connecting members so that the spigot is locked by the retaining element against being pulled out of the opening, and the rear side wall of the recess in the spigot, as seen looking in the coupling direction, being formed by an end surface of an unlocking element mounted on the spigot in an axially slidable arrangement. Further, the invention relates to a combination of such a coupling assembly and a release tool.

In a coupling assembly known from U.S. Pat. No. 5,570,910 A, the male member is integrally formed with the spigot, and the unlocking element is comprised of two sleeves, including an inner sleeve made of metal encompassing the spigot and an outer sleeve made of a plastic material encompassing the female member and engaging, in the unlocked position, with a locking bead in a groove in the female member. The inner metal sleeve is fully split to enable the sleeve to be expanded and mounted on the spigot. The outer sleeve made of plastic is not split but has an inward pointing sealing rib that engages on the male member to form a dust seal. The disadvantage of this known coupling assembly is the elaborate and expensive production of its unlocking element.

Furthermore, the split design of the inner sleeve means that producing an effective seal at the unlocking element, and particularly one that is also liquid-tight, is possible only with difficulty.

It is an object of the present invention to provide a coupling assembly of the type initially referred to that can be manufactured easily and economically and which enables by simple means a liquid-tight sealing of the coupling assembly's connecting zone.

This object is accomplished in accordance with the present invention in that the front side wall of the recess in the male member, as seen looking in the coupling direction, is formed by an annular support element which engages in a circumferential groove of the male member and is supported in axial direction inside the circumferential groove, and that the diameter of that section of the male member in front of the groove, as seen looking in the coupling direction, is the same size as, or smaller than, the smallest inner diameter of the unlocking element.

In the coupling assembly of the present invention the unlocking element can be a closed, rigid annular body adapted to be push-fitted onto the spigot prior to assembling the support element. Hence the unlocking element is easy to manufacture and can be sealed very effectively, for example, to liquid- or gastight standard, by simple means using, for example, an inner lying and an outer lying sealing ring. The coupling assembly of the present invention is also suitable, therefore, for explosion-protected applications. Considering that the unlocking element is mounted from the plug-in side of the spigot, the other end of the male member which is suitable for connection with a rigid or flexible pipeline can be of any desired configuration, being, for example, of an elbow or tee configuration.

A further advantageous possibility provided by the support element of the coupling assembly is the ability to choose different materials for the production of the male member and the production of the support element. The particular requirements needing to be met by the point of support cooperating with the retaining element can thus be met by a suitable choice of material, without this making the male member any more expensive. Thus, for example, it is possible to select a softer, easy-to-process material for the male member, while having the support element made of a harder material suitable for high seating stresses. With the coupling assembly of the present invention it is possible to design the shape of the force transmission surfaces between the support element and the male member relatively freely without it being tied to the shape of the support surfaces cooperating with the retaining element as defined by the locking and unlocking operation.

In an embodiment of the coupling assembly affording particular ease of manufacture, the annular support element as well as the retaining element is a split ring made of a spring material as, for example, spring steel or spring bronze, with a ring made of round wire of circular cross section being particularly suitable. This cross-sectional shape of the support element and retaining element results in favorable conditions for expanding the retaining element while connecting and releasing the coupling assembly. If the coupling assembly is intended for low compressive loads, the split ring can also be made of a plastic material. The round wire from which the retaining element and the support element are fabricated can have the same diameter. The diameters of the round wire cross sections for the retaining element and the support element, on the other hand, may differ. In accordance with a further proposal of the present invention, the support element may also be comprised of a closed ring connected with the spigot in a positive-engagement relationship by permanent radial deformation, for example, by curling a collar in a groove.

In order to secure the retaining element made of a ring of round wire by positive engagement when in the locked position, according to present invention the abutment surface provided on the female member for engagement of the retaining element can be a conical surface whose angle of taper is smaller than the angle between the tangent applied to the retaining element at the point of contact with the support element and the center axis of the coupling assembly. Consequently, the forces acting on the retaining element when the spigot is loaded in pulling direction strive to urge the retaining element radially inwardly against the spigot and axially against the abutment surface on the female member. Movement of the retaining element into the unlocked position is only possible, therefore, if the distance between the abutment surface on the female member and the support element of the spigot is increased a certain amount by urging the spigot into the receiving bore in the female member. This is opposed, however, by the load acting on the coupling assembly. It has proven advantageous for the angle of taper of the abutment surface to be 40° or smaller and for the angle between the tangent and the center axis to be 45° or greater. According to the present invention it is also possible to arrange for the seating surface on the spigot for engagement with the retaining element to have a slightly smaller diameter than the inner surface of the unlocking element which covers the seating surface when unlocking. This ensures that the deformations to the seating surface caused by the action of the retaining element under load do not impair the displaceability of the unlocking element.

The unlocking element is comprised preferably of a cylindrical or conical sleeve which can be axially movably arranged on the spigot or in the receiving bore of the female member and has a radial shoulder serving to introduce the force for moving the sleeve into the unlocked position. Furthermore, the unlocking element of the present invention can have a conical end with an angle of taper designed to promote the displacement of the retaining element into the recess of the female member by the unlocking element.

In the case of coupling assemblies for connecting a flexible pipeline it may be necessary to lock the spigot against rotation relative to the female member. According to the present invention the spigot can be prevented from rotating relative to the female member in the receiving bore of the female member by means of a projection engaging in a recess. A suitable rotary locking device can also be formed by the unlocking element. For this purpose the unlocking element can have radial projections and/or recesses that cooperate with radial projections or recesses of a form deviating from the cylindrical form in the opening of the female member and on the envelope surface of the male member and are in interfitting engagement so that the male member is prevented from rotating relative to the female member. A particularly simple configuration is one in which the unlocking element is comprised of a sleeve formed from sheet metal, wherein the end of the sleeve engaging in the opening of the female member and the corresponding section of the opening are equipped with an interfitting serrated profile and wherein the opposite end of the sleeve is equipped with a polygonal bore embracing a hexagonal section of the male member in a manner preventing relative rotation.

According to a further proposal of the present invention, the coupling assembly in locked position can be biased in axial direction by a spring element bearing with one end against the female member while its other end takes support on the male member via the unlocking element, striving to urge the male member out of the female member against the coupling direction. The spring element operates to maintain the locked coupling assembly in a zero clearance position, making it difficult for the unlocking element to be moved into the unlocked position. Provision can be made in addition for a securing element which has to be removed to enable the unlocking element to be moved into the unlocked position. As spring element it is possible to use a ring made of an elastomeric material which also effects a seal between the unlocking element and the female member. A sealing ring can be arranged in a groove in the spigot in order to seal the unlocking element vis-à-vis the male member.

A further object of the present invention is to provide a combination of a coupling assembly of the type initially referred to and a release tool that enables the coupling assembly to be released with ease and little constructional effort.

This object is accomplished in accordance with the present invention in that the shoulder of the unlocking sleeve and/or an annular collar of the spigot has a recess open in radially outward direction in the abutment surface on the side close to the annular collar or the shoulder, and in that the release tool has a fork with two prongs which enclose a space for accommodating the spigot and, embracing the spigot, are insertable in the recess in radial direction so as to enable the unlocking sleeve to be moved in the release direction by a torque acting on the release tool around an axis linking the points of engagement of the prongs in the recess.

The advantage of the combination of the present invention is that the coupling assembly can be of very compact construction in its axial and radial dimensions. No large area of application is needed on the unlocking sleeve to apply a releasing force, nor is an additional space required in the axial direction because the recess for inserting the release tool can be constructed without it affecting the overall length of the coupling assembly. A further advantage of the configuration according to the present invention is that a comparatively high release force can be achieved with a release tool of small size thanks to the resulting favorable conditions of leverage and force transmission. Hence it is possible to equip the coupling assembly with a comparatively strong spring element held in tension between the shoulder of the unlocking sleeve and the female member without this having a detrimental effect on releasing the coupling assembly. A further advantage finally is that the recess for inserting the release tool, which recess is located on the annular collar of the spigot for example, requires no notable production effort because the recess can be manufactured at the same time as performing the other processing operations. The release tool itself can also be made simply and inexpensively using, for example, a sheet metal material.

A particularly advantageous embodiment has the recess formed by a conical surface. It is possible accordingly for the prongs of the release tool to have gripping surfaces cooperating with the conical surface of the recess and having an inclination corresponding to the angle of taper of the conical surface. Provision can further be made for the gripping surfaces of the prongs, which engage the shoulder or the annular collar inside the recess, to form an angle which opens toward the ends of the prongs. The advantage of this construction is that the release tool can adapt to various diameters. Furthermore, constructing the release tool in this manner also makes it possible for the unlocking sleeve to be moved into the release position by an exclusively radial movement of the release tool when the recess is formed by a conical surface and/or the prongs have correspondingly inclined gripping surfaces. This is an advantage in installation conditions lacking the necessary freedom of movement for swiveling the release tool. It has also proven to be particularly convenient for the handle of the release tool to be arranged at an angle to the prongs of the fork that enables the torque required to release the coupling assembly to be generated by a force applied by hand to the handle in substantially vertical direction to the axis of the coupling assembly. The handle is arranged preferably at an angle of 110° to the prongs.

According to an embodiment affording ease and economy of manufacture, the release tool is comprised of a rectangular plate having along its short side a central indentation forming the space between the prongs.

Embodiments of the present invention will be described in more detail in the following with reference to the accompanying drawings. In the drawings, FIG. 1 is a longitudinal sectional view of the female member and FIG. 2 is a longitudinal sectional view of the male member of a coupling assembly of the present invention;

Figure 1:
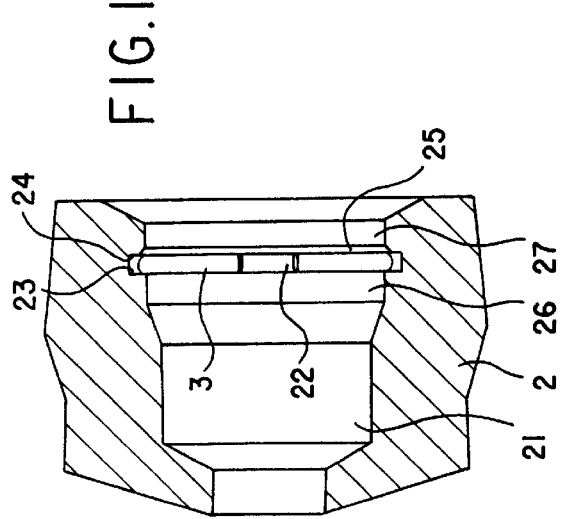
Figure 2:
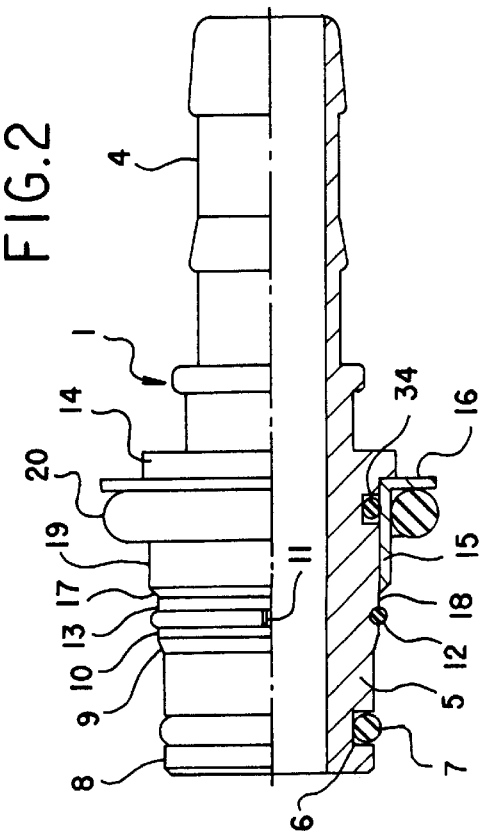
Figure 3:
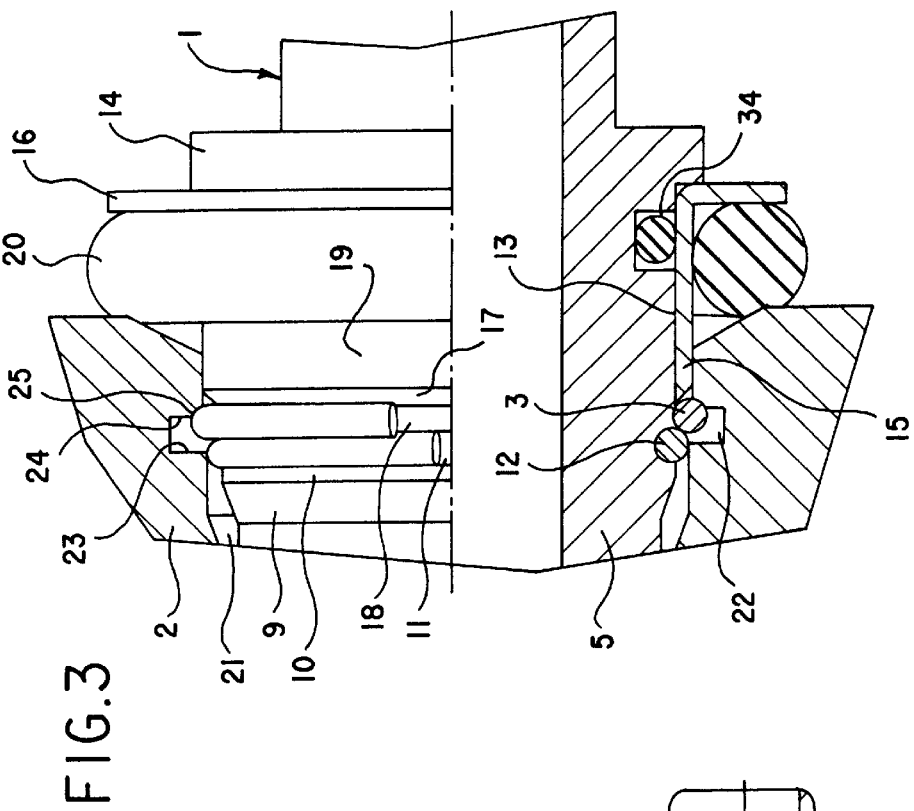
FIG. 3 is a detail, on an enlarged scale, of the coupling assembly of FIGS. 1 and 2 in the locked position.

The coupling assembly shown in FIGS. 1 to 3 is comprised of a male member 1 and a female member 2 which can be connected together by means of a retaining element 3. The male member 1 takes the form of a pipe having a nipple 4 at one end for fastening a pressure line. The other end of the male member 1 is constructed as a spigot 5 carrying a sealing ring 7 in an annular groove 6. The annular groove 6 is located in a cylindrical end section 8 of the outer surface of the spigot 5. Adjacent to the end section 8 is a conical surface 9 whose diameter increases toward the nipple 4 and which merges into a short cylindrical surface 10 of larger diameter. The cylindrical surface 10 is limited at the end remote from the conical surface 9 by a groove 11 extending radially inwardly and accommodating therein a support element 12. The support element 12 is constructed as a split, elastically deformable round-wire snap ring made of stainless spring steel, spring bronze or plastic, for example, and engages with the radially inner half of its cross section in the groove 11 which is adapted to fit the cross-sectional shape of the round-wire snap ring. To assemble, the support element 12 is put on the end section 8 of the spigot 5 and pushed over the conical surface 9, whereby it is expanded, and over the cylindrical surface 10 until it snaps into the groove 11 where it rests with a slight radial bias against the wall of the groove 11.

Adjacent to the groove 11 is a cylindrical surface 13 whose diameter corresponds to the diameter of the cylindrical surface 10. The cylindrical surface 13 is limited in the direction of the nipple 4 by an annular collar 14 of larger diameter. A sleeve-shaped unlocking element 15 with a radial shoulder 16 is seated on the cylindrical surface 13 in an axially movable arrangement. At its end close to the support element 12 the unlocking element 15 has a conical end surface 17 which tapers toward the support element 12 and has an angle of taper amounting to about 45° relative to the longitudinal axis of the spigot 5. Between the support element 12 and the unlocking element 15 is a space forming a recess 18. The unlocking element 15 has a cylindrical envelope surface 19 and its outer diameter is a few tenths of a millimeter larger than the outer diameter of the support element 12. Arranged on the unlocking element 15 is an annular spring element 20 made of an elastomeric material adapted to bear against the shoulder 16. Inside an annular groove in the cylindrical surface 13 is a sealing ring 34 which seals off the sliding gap between the cylindrical surface 13 and the bore in the unlocking element 15 to the outside.

To accommodate the spigot 5, the female member 2 has a full-length receiving bore 21 whose inner diameters are sized to fit the outer diameters of the various sections of the spigot 5. Inside the receiving bore 21 is an annular recess 22 in which the retaining element 3 is positioned. The radial depth of the recess 22 is calculated to enable the retaining element 3 to be displaced fully into the recess 22. The rear side wall 23 of the recess 22, as seen looking in the coupling direction, extends vertically to the longitudinal axis of the receiving bore 21. The front side wall 24 of the recess 22, as seen looking in the coupling direction, has an abutment surface 25 with a 30° chamfer for the retaining element 3 in the locked position. The cylindrical bore surfaces 26, 27 on either side of the recess 22 have different diameters corresponding to the different outer diameters of the support element 12 and the envelope surface 19. Like the support element 12, the retaining element 3 is constructed as a split round-wire snap ring. In the relieved state the retaining element 3 has an inner diameter corresponding essentially to the diameter of the cylindrical surface 13 of the spigot 5.

To couple the male member 1 and the female member 2, the spigot 5 is inserted into the receiving bore 21 and urged inside with elastic deformation of the spring element 20 until the retaining element 3, expanded by the conical surface 9 and the support element 12 and displaced into the recess 22, locks into the recess 18 with a snap action. The locked position thus adopted is shown in FIG. 3. In this position the retaining element 3 is held in tension by the action of the biased spring element 20 between the support element 12 of the spigot 5 and the abutment surface 25 of the female member 2 so that it is urged against the cylindrical surface 13 of the spigot 5 and is unable to yield radially outwardly into the free area of the recess 22. Self-releasing of the coupling assembly with the unlocking element 15 positioned as shown is possible, therefore, only if a component is destroyed.

The coupling assembly can be disconnected by urging the spigot 5, and with it the unlocking element 15, into the receiving bore 21 with simultaneous deformation of the spring element 20. As this occurs, the retaining element 3 is relieved of the biasing force of the spring element 20 and, together with the spigot 5 and the support element 12, is moved in the recess 22 by the unlocking element 15 until it abuts the side wall 23. Subsequently, urging the unlocking element 15 together with the spigot 5 further into the receiving bore 21 causes the retaining element 3 to be expanded by the conical end surface 17 of the unlocking element 15 and to be displaced radially outwardly into the recess 22. Once this unlocked position is reached, the spigot 5 together with the unlocking element 15 and the support element 12 can be pulled out of the female member 2. As FIG. 1 shows, the retaining element 3 remains in the recess 22 of the female member 2.

Figure 12:
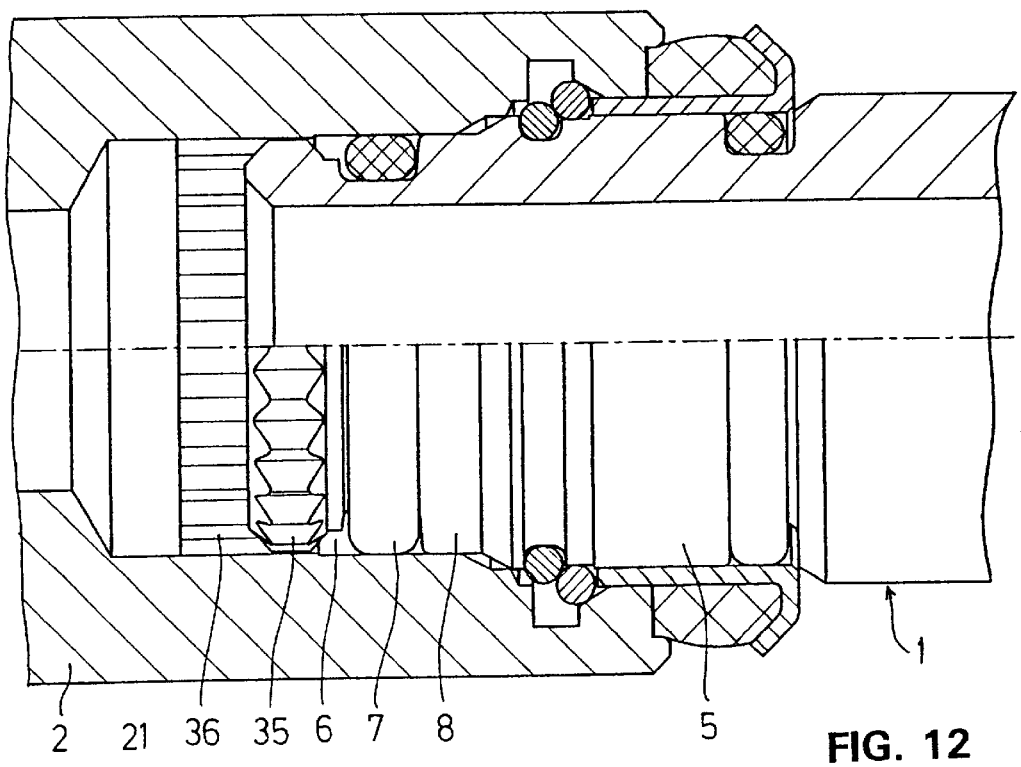
FIG. 12 is a longitudinal sectional view of a further embodiment of a coupling assembly with a rotary locking device.

Instead of a ring made of an elastomeric material it is possible to use a disk spring as spring element 20. Furthermore, the unlocking stroke of the unlocking element required to unlock the coupling assembly can also be obtained by arranging a removable spacer between the spring element 20 and the shoulder 16. It is possible furthermore for the spring element 20 to be replaced by a spring element at some other location, for example, in the receiving bore 21, which tensions the male member and the female member axially in the locked position. As a further possibility, as shown in FIG. 12 the unlocking element 15 can be screw-fitted to the spigot 5 by means of a thread 46. The unlocking stroke is then effected by turning the unlocking element.

Figure 4:
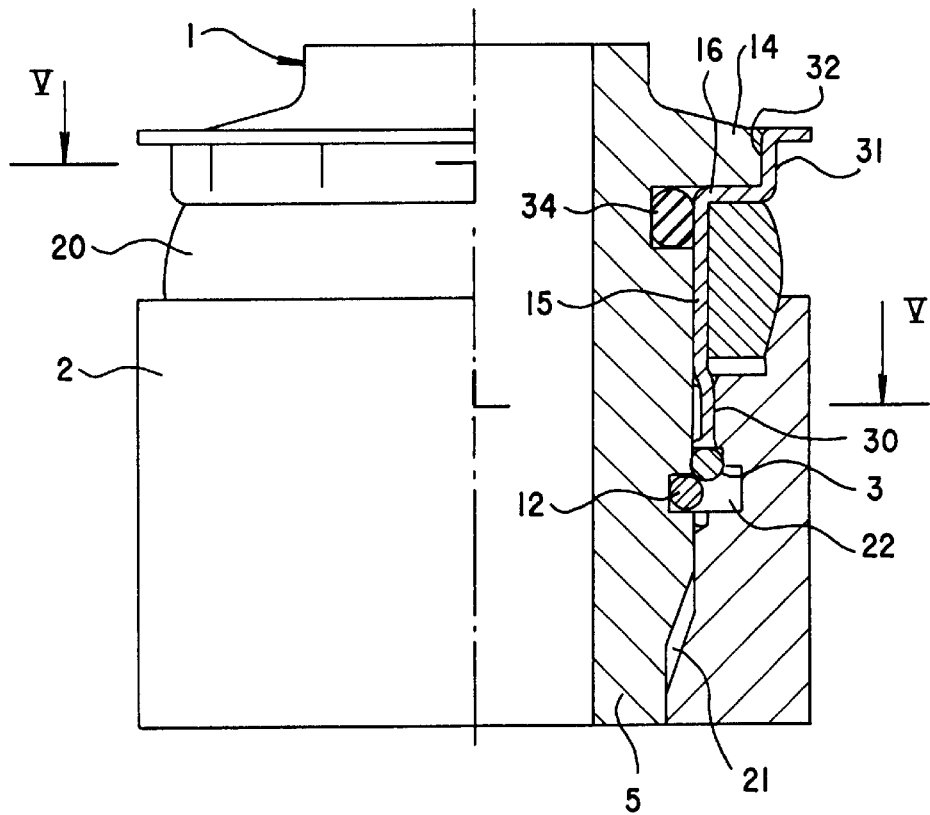
FIG. 4 is a longitudinal sectional view of a coupling assembly of the present invention with a rotary locking device.
Figure 5:
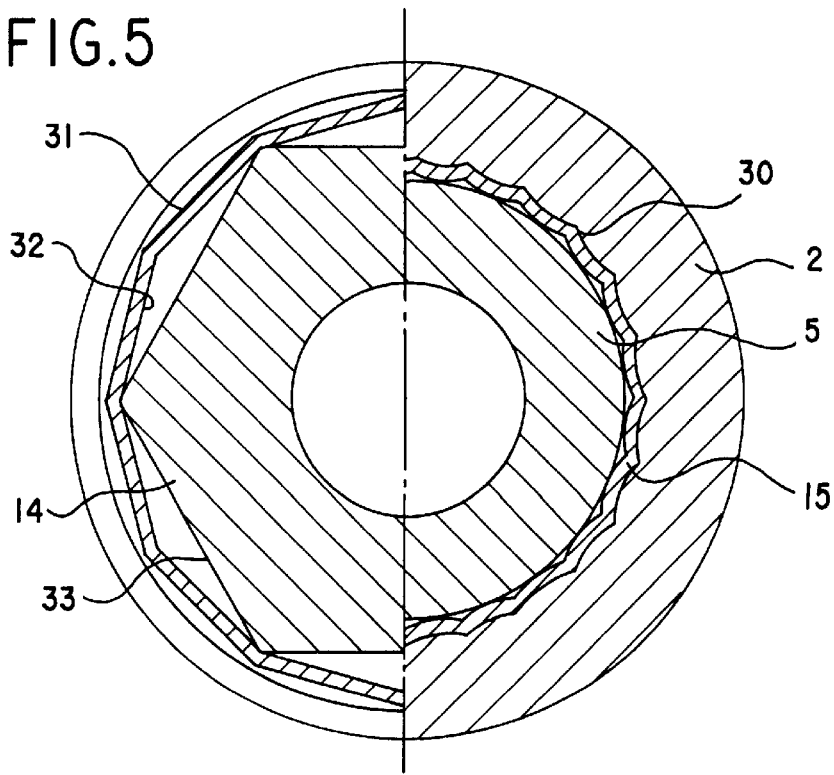
FIG. 5 is a cross sectional view of the coupling assembly taken along the line V—V of FIG. 4.

In the embodiment shown in FIGS. 4 and 5, the unlocking element 15 made of a sheet metal material is constructed as a rotary locking device which prevents the spigot 5 inserted in the female member 2 from rotating relative to the female member 2. The end of the unlocking element 15 on the side close to the retaining element 3 is equipped on its outside with an obtuse-angled serration 30 formed by radial deformation of the sheet metal material. The serration 30 comprises a plurality of axially parallel teeth. The bore surface 27 of the receiving bore 21 in the female member 2 has an internal serration registering with the serration 30, with a plurality of notches into which the teeth of the serration 30 engage. Hence when the unlocking element 15 is inserted in the female member 2, it is connected with the female member 2 in a manner allowing axial displacement but preventing relative rotation. The shoulder 16 of the unlocking element 15 abutting the annular collar 14 of the male member 1 is equipped with a flange 31 embracing the collar 14 and shaped in the form of a bihexagonal prism with a correspondingly shaped inner surface 32. The collar 14 of the male member 1 is configured as a hexagonal prism 33, with the edge-to-edge diameter of the prism 33 corresponding to that of the inner surface 32 of the flange 31. The edges of the prism 33 thus engage in every second corner of the bihexagonal inner surface of the flange 31, thereby producing a non-rotatable connection between the flange 31 and the collar 14. The advantage of the described embodiment of the rotary locking device is that it is easy to manufacture and permits the coupling assembly to be coupled in numerous angular positions. No additional components are needed to form the rotary locking device.

Figure 6:
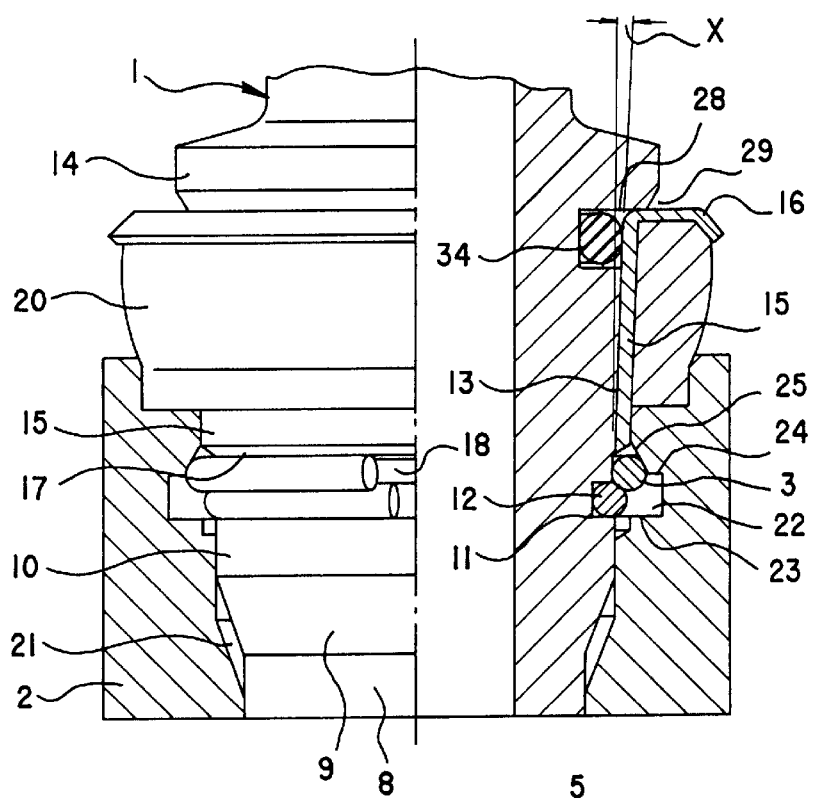
FIG. 6 is a view, partly in section, of a coupling assembly of the present invention suitable for cooperation with a release tool.
Figure 7:
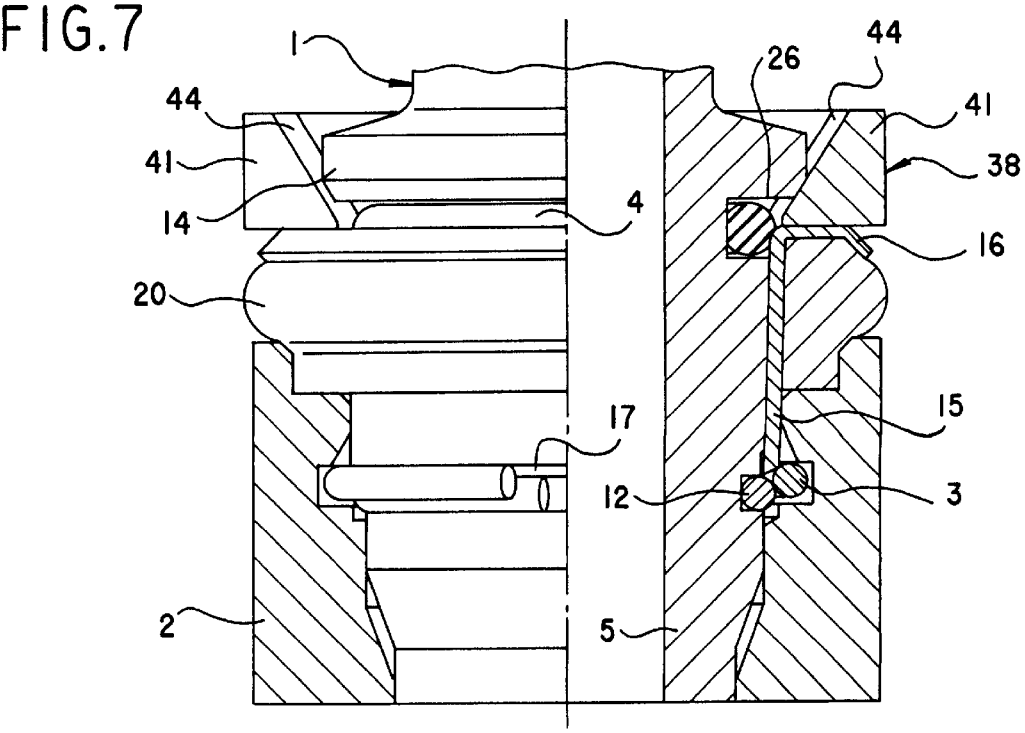
FIG. 7 is a view of the coupling assembly of FIG. 6 in the unlocked position, showing a release tool applied.
Figure 8:
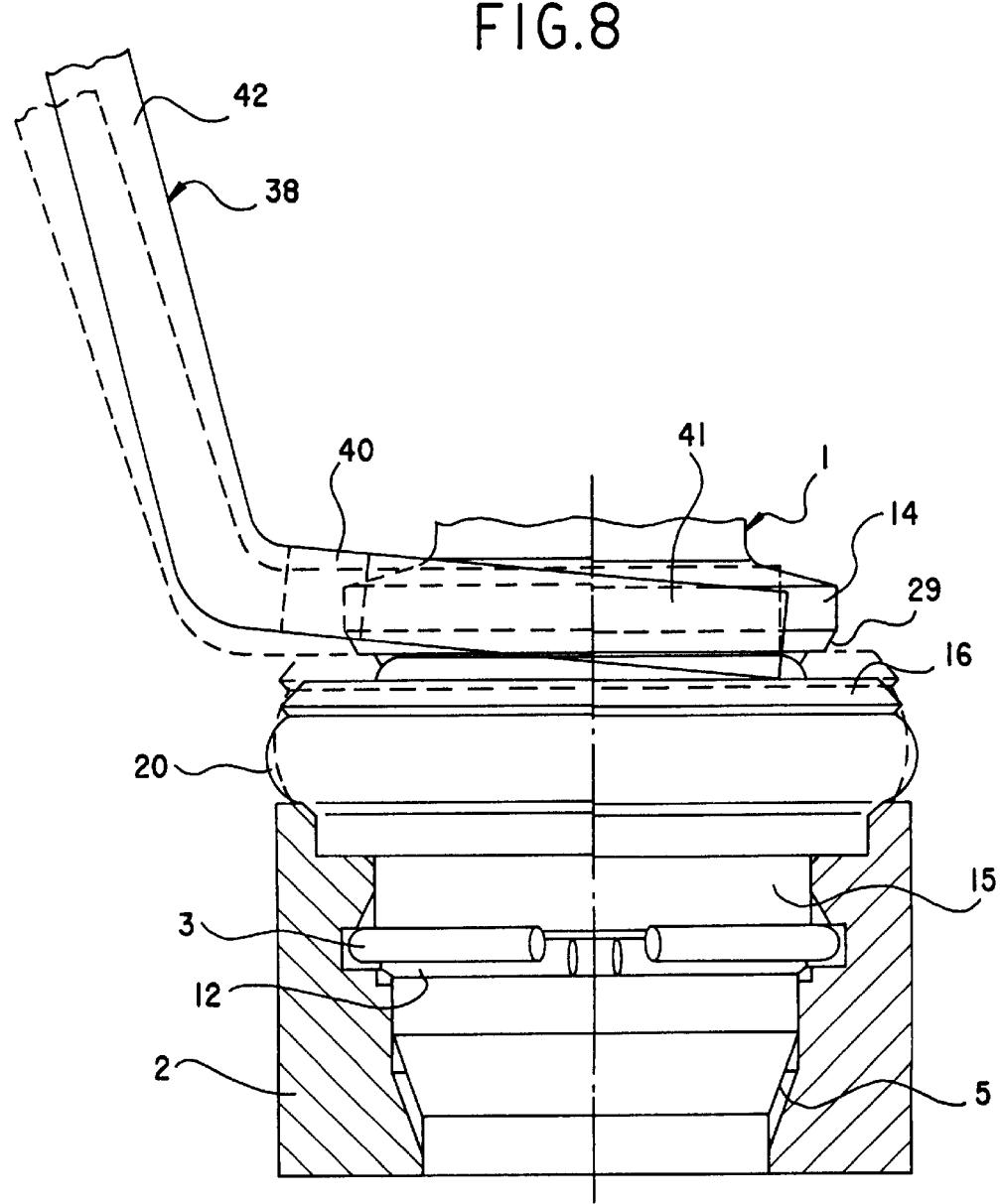
FIG. 8 is a projection of the coupling assembly, showing the release tool of FIG. 7 applied.

The embodiment presented in FIGS. 6 to 8 is intended to effect uncoupling by means of a special release tool and is adapted in its construction to said tool. Except for the features described in more detail in the following, this embodiment corresponds in its basic structure to the embodiments described above.

As shown in FIG. 6, the seating surface 13 of the spigot 5 in this embodiment is of a slightly conical configuration, its diameter being slightly larger than the diameter of the cylindrical surface 10, increasing at an angle of taper X in a direction opposite to the coupling direction. The unlocking sleeve 15 seated on the seating surface 13 is also of conical shape with the same angle of taper so that the clearance between the sleeve bore and the seating surface 13 increases when the unlocking sleeve 15 is moved into the unlocked position. The unlocking sleeve is therefore easy to release and move even in the presence of corrosion. The shoulder 16 of the unlocking sleeve 15 bears against an abutment surface 28 of the annular collar 14 when the coupling assembly is closed. At the outer edge of the abutment surface 28, a 30° chamfer forms a recess 29 in which a release tool 38 can be inserted as shown in FIG. 7.

Figure 9:
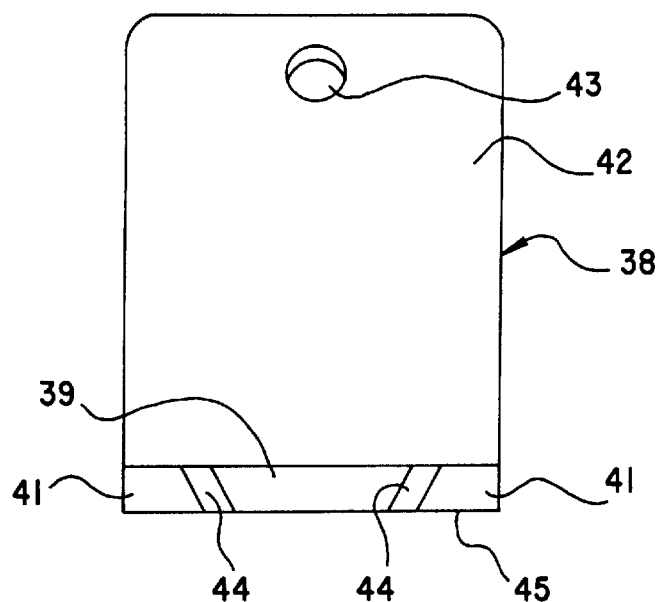
FIG. 9 is a front view of a release tool of the present invention.
Figure 10:
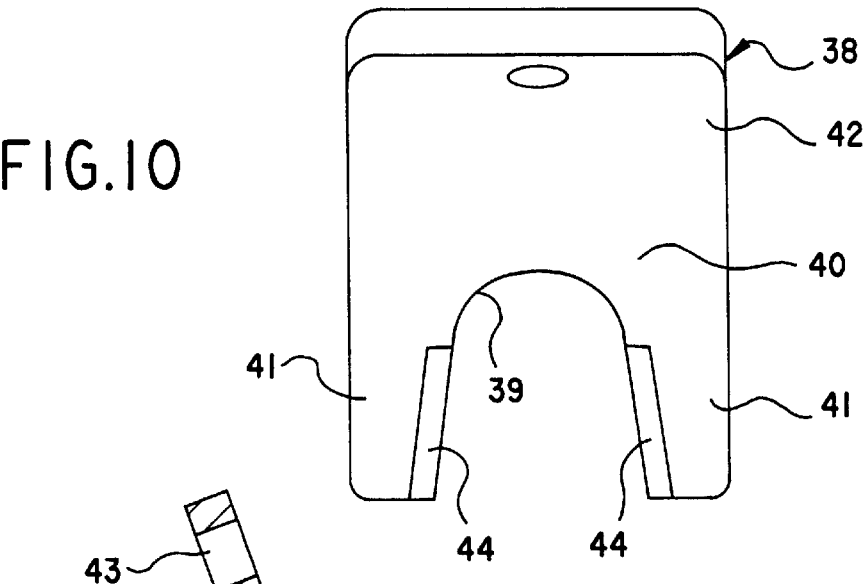
FIG. 10 is a top view.
Figure 11:
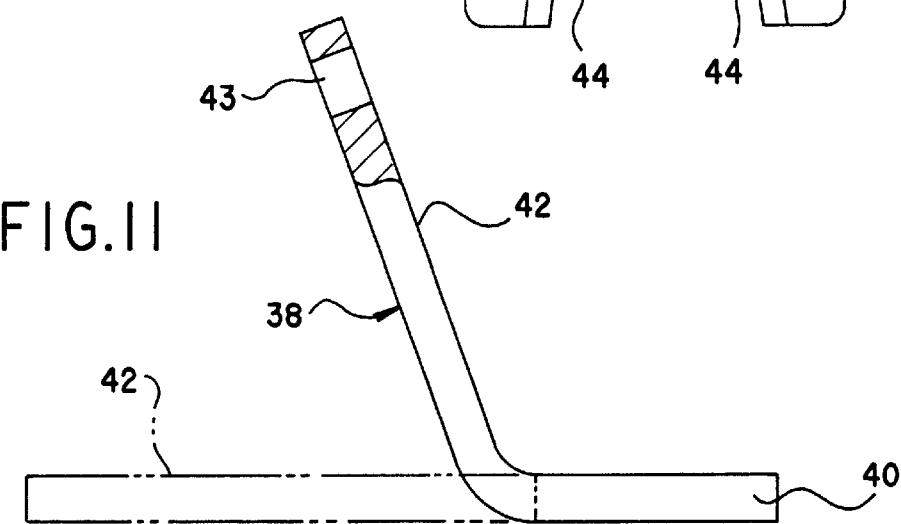
FIG. 11 is a side view of the release tool of FIG. 9.

The release tool 38 shown in FIGS. 9 to 11 is comprised of a rectangular plate with a central indentation 39 on one of its short sides, thus forming a fork 40 with two prongs 41. That part of the plate adjoining the fork 40 forms the handle 42 of the release tool 38 and is bent about an axis parallel to the short sides of the plate so that the handle 42 and the fork 40 enclose an angle of around 110°. The handle 42 has a hole 43 for hanging up the release tool 38. On their facing sides formed by the indentation 39, the prongs 41 have flat gripping surfaces 44 inclined at an angle of 7.5° to the center axis of the fork 40 so that the distance between the gripping surfaces 44 increases toward the open end of the indentation 39. At the same time the gripping surfaces 44 are inclined at an angle of 60° to the plate bottom 45.

To disconnect the coupling assembly the release tool 38 with the fork 40 is seated onto the annular collar 14 of the spigot 5, whereby the prongs 41 embrace the annular collar 14 and their gripping surfaces 44 engage in the recess 29 with the annular collar 14, while the abutment surface formed by the plate bottom 45 engages the shoulder 16 of the unlocking sleeve 15. If the handle 42 is now pressed by hand toward the male member 1, the fork 40 turns around an axis defined by the two points of contact between the gripping surfaces 44 and the annular collar 14, whereby the prongs 41 bearing against the annular collar 14 are urged against the shoulder 16 of the unlocking sleeve 15, moving it into the release position. Once the release position is reached and the retaining element 3 is displaced from its locked position into the recess 22 in the female member 2, the reactive force supported on the spigot 5 during the release operation can no longer be transmitted therefrom via the retaining element 3 to the female member 2, causing the spigot 5 to be moved by the spring element 20 in the release direction inside the receiving bore 21 of the female member 2 so that it can then be pulled out of the receiving bore 21 with ease. This operation is illustrated in FIG. 8 showing the beginning of the release operation in broken lines and the adoption of the release position in solid lines.

FIG. 7 shows the adoption of the release position by a radial movement of the release tool 38. In this case the release tool 38, and hence the unlocking sleeve 15, is axially moved in the release direction by the wedge action of the doubly inclined gripping surfaces 44 on the prongs 41, without any turning of the release tool 38 occurring, as shown in FIG. 8. A straight release tool with an unbent handle 42 as indicated by the dot-and-dash line in FIG. 11 is particularly suitable for performing such a release movement. It will be understood, of course, that it is also possible to perform a swivel movement with a straight release tool of this type, as is shown in FIG. 8. The straight release tool may also be an advantage in limited space and is particularly easy to apply.

Figure 13:
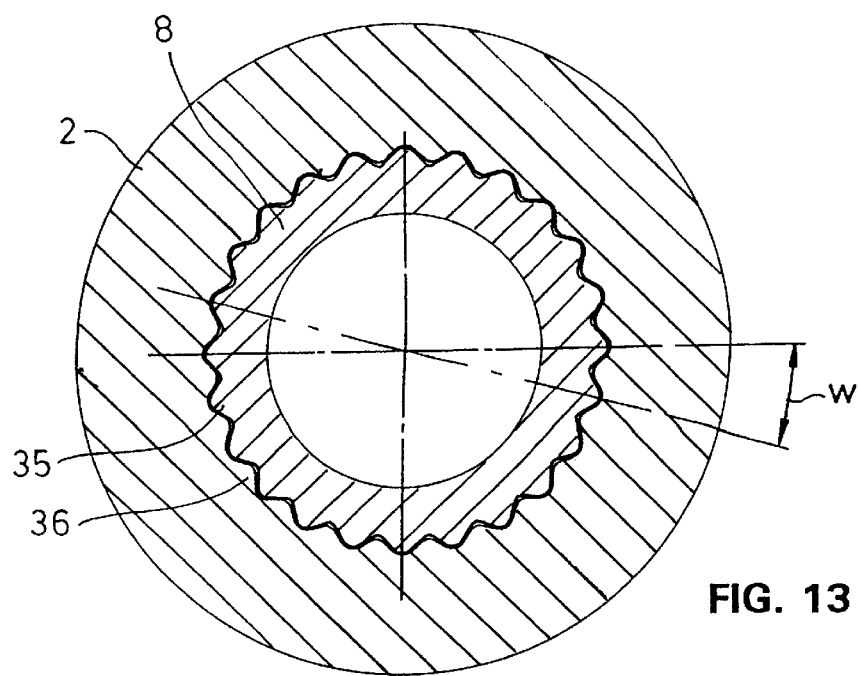
FIG. 13 is a cross sectional view of the coupling assembly of FIG. 12.

In the embodiment of the coupling assembly shown in FIGS. 12 and 13, the end section 8 of the spigot 5 has an external serration 35 located in front of the annular groove 6 as seen looking in the coupling direction, and which in the illustrated locked position is in meshing engagement with an internal serration 36 of corresponding configuration formed inside the receiving bore 21 of the female member 2. The axially parallel teeth of the two serrations 35, 36 cooperate to form a rotary lock between the male member 1 and the female member 2, with the plurality of teeth ensuring the transmission of a sufficiently high torque in spite of the small radial dimensions and enabling, thanks to the small angular distance w between the teeth, a large number of coupling positions. By reason of its arrangement inside the area of the coupling assembly sealed by the sealing ring 7, the rotary locking device is also effectively protected from contamination and corrosion.

Numerous further embodiments of the coupling assembly of the present invention are possible in addition to the examples described. Any known form of pipe fitting, whether straight, elbow, tee or the like, can be implemented with the described coupling assembly. It is also possible for the male member to be constructed as a threaded element or as a part formed integral with a housing, and for the female member to form the disconnectable plug. Male and female members can also be composed of several parts joined together by screwing, flanging, adhesive bonding, welding or the like. Using such a design approach also makes it possible for the coupling assembly of the present invention to be adapted to a shaped bore already existing on an apparatus. For example, a union screw forming the receiving bore for the spigot can be threaded into an existing connecting bore with an internal thread which, together with the union screw, then forms the female member of the coupling assembly.

What is claimed is:

1. A coupling assembly for pipelines having two connecting members, including a male member and a female member which are connectable to and separable from each other, the male member having a spigot to be received in an opening in the female member for locking engagement therein by a radially deformable retaining element which is arranged in a recess in the opening of the female member and is urged into said recess by radial elastic deformation during the coupling operation, said spigot being provided with a recess into which the retaining element, due to elastic recovery, engages in the locked position of the connecting members so that the spigot is locked by the retaining element against being pulled out of the opening, and the rear side wall of the recess in the spigot, as seen looking in the coupling direction, being defined by an end surface of an unlocking element mounted on the spigot in an axially slidable arrangement, characterized in that the front side wall of the recess in the spigot, as seen looking in the coupling direction, is formed by an annular support element which engages in a circumferential groove in the spigot and is supported in axial direction inside the circumferential groove, and that the diameter of that section of the spigot in front of the circumferential groove, as seen looking in the coupling direction, is at most the same size as the smallest inner diameter of the unlocking element.

2. The coupling assembly as claimed in claim 1, characterized in that at least one of the support element and the retaining element is a split ring made of a spring material.

3. The coupling assembly as claimed in claim 2, characterized in that the split ring has a circular cross section.

4. The coupling assembly as claimed in claim 1, characterized in that the abutment surface provided on the female member for engagement of the retaining element is a conical surface whose angle of taper is smaller than the angle between the tangent applied to the retaining element at the point of contact with the support element and the center axis of the coupling assembly.

5. The coupling assembly as claimed in claim 1, characterized in that the recess on the spigot for engagement with the retaining element has a slightly smaller diameter than the inner surface of the unlocking element which covers the seating surface when unlocking.

6. The coupling assembly as claimed in claim 1, characterized in that a spring element biased axially in the locked position bears with one end against the unlocking element and the male member and with its other end against the female member.

7. The coupling assembly as claimed in claim 6, characterized in that the unlocking element is comprised of a cylindrical sleeve which is axially movably arranged on the spigot and has a radial shoulder serving to introduce the force for moving the sleeve into the unlocked position.

8. The coupling assembly as claimed in claim 7, characterized in that a removable securing means is provided for preventing the unlocking element from being moved into the unlocked position.

9. The coupling assembly as claimed in claim 7, characterized in that the unlocking element is connected with the spigot by means of a thread.

10. The coupling assembly as claimed in claim 7, characterized in that the spring element takes support upon the shoulder of the unlocking element which in turn bears against an annular collar of the male member.

11. The coupling assembly as claimed in claim 10, characterized in that a seal ring is provided between the unlocking element and the male member and the spring element seals the unlocking element with respect to the female member in the locked position.

12. The coupling assembly as claimed in claim 1, characterized in that the spigot is prevented from rotating relative to the female member in the receiving bore of the female member by at least one projection associated with one of the male member and the female member engaging in at least one corresponding recess in the other of the male member and the female member.

13. The coupling assembly as claimed in claim 12, characterized in that the at least one projection is an external serration on the front end section of the spigot in front of a sealing ring, as seen looking in the coupling direction, which is in meshing engagement with the at least one corresponding recess defined by an internal serration formed in the receiving bore of the female member.

14. The coupling assembly as claimed in claim 12, characterized in that the unlocking element has at least one of radial projections and recesses that cooperate with a corresponding ones of said at least one projection and at least one recess, said projections and recesses being of a form deviating from the cylindrical form in the opening of the female member and on the envelope surface of the male member and are in interfitting engagement so that the male member is prevented from rotating relative to the female member.

15. The coupling assembly as claimed in claim 14, characterized in that the unlocking element is comprised of a sleeve formed from sheet metal, wherein the end of the sleeve engaging in the opening of the female member and the corresponding section of the opening are equipped with an interfitting serrated profile, and the opposite end of the sleeve has a polygonal inner surface embracing a polygonal section of the male member in a manner preventing relative rotation.

16. A combination of a coupling assembly for pipelines and a release tool, in which the coupling assembly has a male member comprising a spigot to be received in an opening in the female member for locking engagement therein by an elastically deformable retaining element which is arranged in a recess in the opening of the female member and is urged into said recess by radial deformation during the coupling operation, and said retaining element engaging in the locked position of the spigot, due to elastic recovery within a recess in the spigot, so that the spigot is locked by the retaining element against being pulled out of the opening, and in which the rear side wall of the recess in the spigot, as seen looking in the coupling direction, is defined by an end surface of a cylindrical unlocking sleeve mounted on the spigot in an axially slidable arrangement, said unlocking sleeve having a radial shoulder abutting an annular collar of the spigot for the introduction of a displacement force, characterized in that one of the shoulder of the unlocking sleeve and the annular collar of the spigot has a recess open in radially outward direction in the abutment surface on the side close to the one of the annular collar and the shoulder, and in that the release tool has a fork with two prongs which enclose a space for accommodating the spigot and, embracing the spigot, are insertable in the recess in radial direction in such manner that the unlocking sleeve is movable in the release direction by a torque acting on the release tool around an axis linking the points of engagement of the prongs in the recess.

17. The combination as claimed in claim 16, characterized in that the recess on the one of the annular collar and the shoulder is formed by a conical surface.

18. The combination as claimed in claim 17, characterized in that the prongs of the release tool have flat gripping surfaces engageable with the conical surface of the recess and having an inclination corresponding to the angle of taper of the conical surface.

19. The combination as claimed in claim 18, characterized in that the gripping surfaces of the prongs, which engage the one of the shoulder and the annular collar inside the recess, form an angle which opens toward the ends of the prongs.

20. The combination as claimed in claim 16, characterized in that the release tool has a handle which is arranged at an angle to the fork so as to enable the torque required to release the coupling assembly to be generated by a force applied by hand to the handle in substantially vertical direction to the axis of the coupling assembly.

21. The combination as claimed in claim 16, characterized in that the release tool is comprised of a rectangular plate having along its short side a central indentation forming the space between the prongs.

* * * * *